United States Patent [19]

Caspar

[11] Patent Number: 4,848,551
[45] Date of Patent: Jul. 18, 1989

[54] TORSIONAL VIBRATION DAMPER
[75] Inventor: Manfred Caspar, Schwalbach-Elm, Fed. Rep. of Germany
[73] Assignee: Fichtel & Sachs AG, Schweinfurt, Fed. Rep. of Germany
[21] Appl. No.: 74,555
[22] Filed: Jul. 17, 1987
[30] Foreign Application Priority Data
Jul. 19, 1986 [DE] Fed. Rep. of Germany ....... 3624496
[51] Int. Cl.⁴ ........................... F16D 3/12; F16D 3/66
[52] U.S. Cl. .................... 192/106.2; 74/574; 464/66; 464/68
[58] Field of Search ...................... 192/106.2; 74/574; 464/7, 66, 68, 67

[56] References Cited

U.S. PATENT DOCUMENTS

| Re. 22,635 | 4/1945 | Thelander | 192/106.2 X |
|---|---|---|---|
| 2,274,174 | 2/1942 | Wemp | 192/106.2 |
| 2,674,863 | 4/1954 | Thelander | 192/106.2 X |
| 2,826,902 | 3/1958 | De Coursey | 192/106.2 X |
| 3,138,039 | 6/1964 | Zeidler et al. | 192/106.2 X |
| 3,863,747 | 2/1975 | Werner et al. | 192/106.2 |
| 4,565,273 | 1/1986 | Tojima et al. | 192/106.2 |
| 4,573,562 | 3/1986 | De Land | 192/106.2 |

FOREIGN PATENT DOCUMENTS

| 2848748 | 3/1981 | Fed. Rep. of Germany . | |
|---|---|---|---|
| 2036925 | 7/1980 | United Kingdom . | |
| 2175067 | 11/1986 | United Kingdom | 192/106.2 |
| 2182415 | 5/1987 | United Kingdom . | |
| 2182416 | 5/1987 | United Kingdom . | |

Primary Examiner—Rodney H. Bonck
Attorney, Agent, or Firm—Toren, McGeady & Associates

[57] ABSTRACT

The torsional vibration damper has annular cover and side discs which are connected with one another in sealed manner in the region of their external circumference and are sealed off in the region of their internal circumference through annular discs movably in relation to a hub disc arranged between these discs. The closed annular space thus produced contains lubricant to reduce wear in the springs which rotationally elastically couple the components of the torsional vibration damper. At least one of the cover or side discs is made axially elastic. Resilient members are provided which clamp the hub disc in between the sealing friction discs and ensure a defined friction torque dimensioned especially for idling operation.

12 Claims, 3 Drawing Sheets

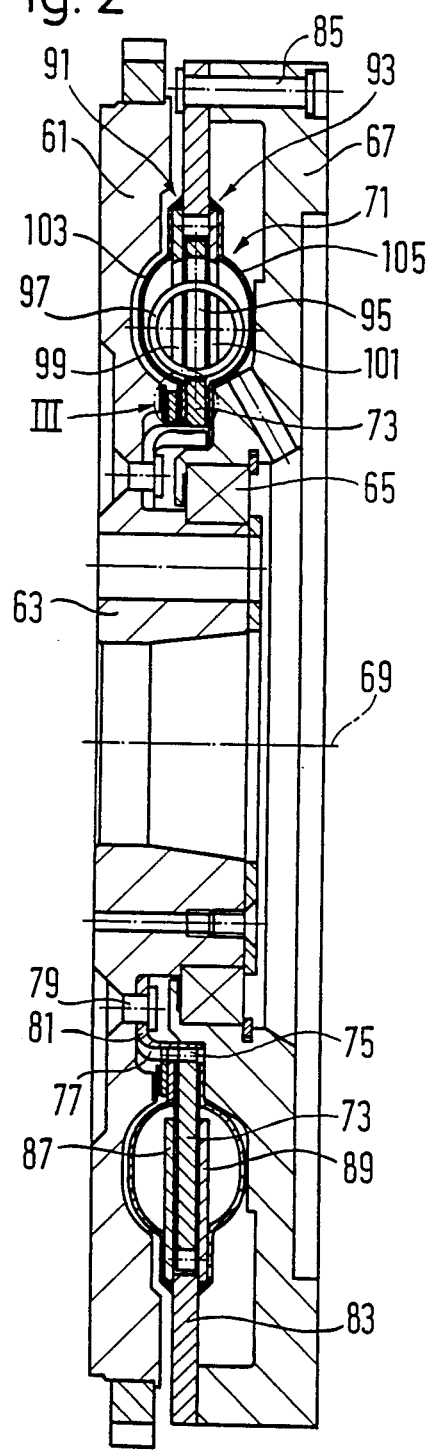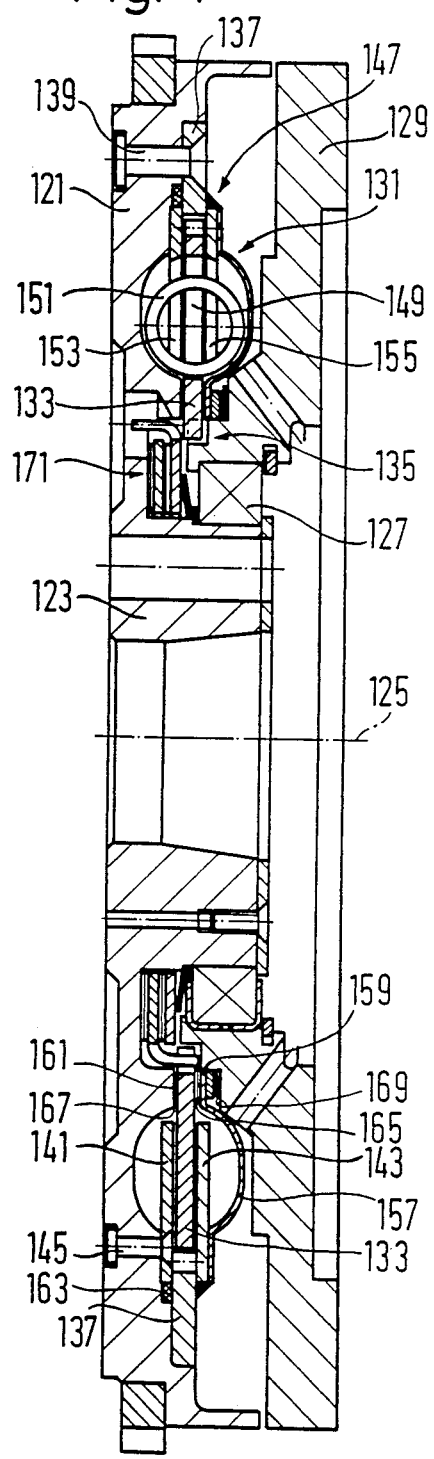

though rotatable in relation to one another about the common axis of rotation.

TORSIONAL VIBRATION DAMPER

BACKGROUND OF THE INVENTION

The invention relates to a torsional vibration damper, especially for installation in the drive line of a motor vehicle.

From German Patent No. 2,848,748 a torsional vibration damper is known having three disc parts rotatable about a common axis of rotation, of which two outer disc parts enclose a middle disc part axially between them. The two outer disc parts are formed as gaplessly closed castings which are firmly connected with one another to form a unit which is rotatable about the common axis of rotation in relation to the middle disc part and encloses the middle disc part in sealed manner. The unit of the two outer disc parts is rotationally elastically coupled with the middle disc part through several springs staggered in relation to one another in the circumferential direction, the springs being arranged in axially corresponding apertures of the three disc parts. Radially between the rotation axis and the springs each of the two outer disc parts is sealed off in relation to the middle disc part through sealing rings. Thus the two outer disc parts form a housing which as a whole is sealed off to the exterior but is rotatable in relation to the middle disc part. The housing can be filled at least partially with a lubricant in order to reduce the wear between components resting on one another or moving in relation to one another.

The constructional expense f the known torsional vibration damper is comparatively high, especially if, as usual in such torsional vibration dampers, friction devices are to be provided for damping.

It is an object of the invention to improve an enclosed torsional vibration damper of the kind as explained above which may be filled at least partially with a lubricant, so that the friction torque caused by seals has exactly predeterminable values. The torsional vibration damper should furthermore have comparatively low constructional expense and more especially the minimum friction torque which can be achieved with such a torsional vibration damper should be exactly predetermined.

SUMMARY OF THE INVENTION

In accordance with the invention at least one of the two outer disc parts of the torsional vibration damper is axially elastic and the two outer disc parts are sealed off in relation to the middle disc part not by separate sealing rings but directly through friction rings of the friction device which damps the torsional vibrations. The frictional device comprises axially acting spring means which not only determine the friction torque but also generate the abutment forces necessary for the seal. In this way not only can he friction torque, especially the minimum friction torque to be predetermined for the idling operation in a motor vehicle drive line, be exactly predetermined but also an adequate seal of the lubricant reserve enclosed by the two outer disc parts can be achieved. Polytetrafluoroethylene is especially suitable as material for the friction rings.

The spring means can be the inherent elasticity of the outer disc parts. However it has proved expedient if at least one of the two outer disc parts consists of two annular discs of which one is formed as axially elastic, gaplessly closed cover disc and takes over the sealing function, while the other annular disc is arranged between this cover disc and the middle disc part and contains the apertures intended for the reception of the springs. This side disc takes over the torque transmission and can be of especially simple configuration, especially made as a plane disc. The axially elastic cover disc can thus be produced from a material better adapted to the springing and sealing purpose, especially a thinner material, than the thicker and thus necessarily stiffer side disc. By gaplessly closed discs there are here and hereinafter to be understood discs which either have closed surfaces or at most have sealed passage openings for securing elements or the like.

The torsional vibration damper as proposed within the scope of the invention is especially suitable for clutch discs of motor vehicle friction clutches or two-mass flywheel systems. In so far as additional spring means are used in clutch discs for the generation of the friction force, for example dished springs, bridge parts are to be provided through which the dished spring supported on the axially elastic cover disc for the one part can be supported through the middle disc part on the opposite outer disc part. In this case the bridge part passes through openings of the middle disc part which must be of such large dimensions that they do not hinder the relative movement of the bridge part and of the middle disc part.

In the case of two-mass flywheel systems the two flywheels of the system are mounted rotatably but axially fixedly on one another. In this case the bearing can be utilized for the transmission of the initial stress forces of the dished spring.

In two-mass flywheel systems the construction expense can be reduced if one of the two flywheels of the system forms one of the two outer side discs and thus is utilized for sealing.

The sealing of the two outer disc parts can be effected in a simple form by surrounding weld seams. However annular seals, for example 0-rings, can also be provided. Such annular seals are especially advantageous if outer disc parts consisting of two discs are to be sealed off in relation to securing rings. This can be achieved in the simplest way in that the axially elastic cover disc protrudes beyond the external circumference of the side disc provided with said apertures for the springs and is bent over, for example crimped over, towards the securing ring. The sealing ring is pressed tightly by this bent-over edge of the cover disc against surfaces both of the side disc and of the securing ring. The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 shows an axial longitudinal section through a two-mass flywheel system with a torsional vibration damper in accordance with the invention for installation in the drive line of a motor vehicle;

FIG. 4 an axial longitudinal section through a variant of a two-mass flywheel system.

DETAIL DESCRIPTION OF THE DRAWINGS

Figure 1:
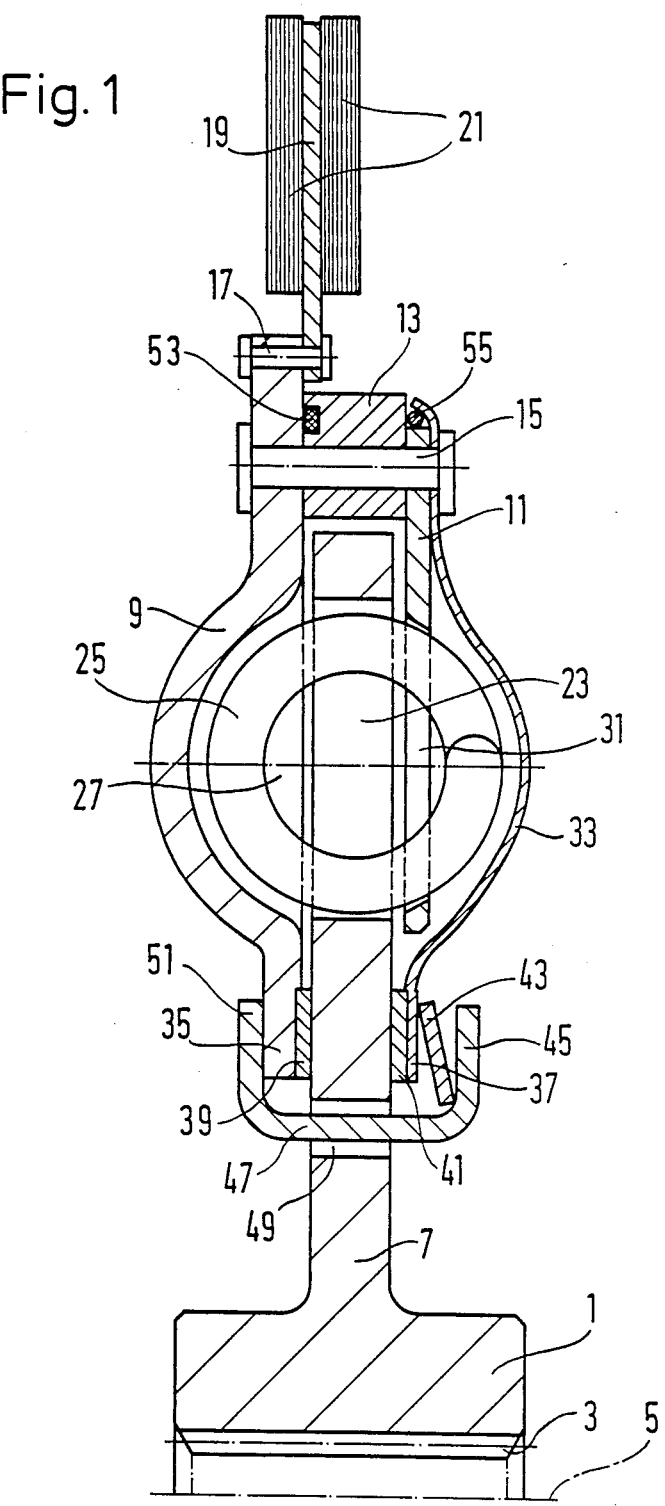
FIG. 1 shows an axial longitudinal section through the upper half of a clutch disc for a motor vehicle friction clutch with a torsional vibration damper according to the invention.

FIG. 1 shows a clutch disc for an otherwise conventional motor vehicle friction clutch having a hub 1 which is couplable through a toothing 3 non-rotatably but axially displaceably with an input shaft (not illustrated further) of a transmission, which shaft is rotatable about a rotation axis 5. From the hub 1 a hub disc 7 protrudes radially outwards. Axially on both sides of the hub disc 7 there are arranged side discs 9, 11 of annular disc form which are firmly connected with one another into a unit radially outside the hub disc 7 by rivets 15 through a distance ring 13. The unit is rotatable in relation to the hub disc 7 about the rotation axis 5 and carries clutch friction linings 21 on a drive disc 19 secured by rivets 17 to the side disc 9.

Several windows 23 in which helical compression springs 25 are arranged are provided in distribution in the circumferential direction in the hub disc 7. FIG. 1 shows only one of the springs 25. The side discs 9, 11 contain apertures 27 and 31 in axial correspondence to the apertures 23, in which the individual springs 25 engage. The apertures 23, 27, 31 have stop edges. The aperture 27 is not an opening but a closed recessed portion of side disc 9 displaced outwardly relative to the hub disc 7. Facing one another in the circumferential direction which lie opposite to the end faces of the spring 25 and co-operate with the end faces. On relative rotation of the hub flange 7 for the one part and the side discs 9, 11 for the other part the springs 25 are subjected to compression stress. The springs 25 couple the side discs 9, 11 and thus the drive disc 19 rotationally elastically with their hub disc 7 and thus the hub 1. As usual in such torsional vibration dampers, several sets of springs can also be provided which come into action in different relative rotation angle ranges.

The side disc 9 is gaplessly tightly closed, that is has no free openings. If openings are provided for the passage of additional components, for example for the rivets 15, these openings are tightly closed by the components, here the rivets 15. In the example of embodiment as illustrated the side disc 9 is made with comparatively thick walls as a casting. The side disc 11 is formed as a plane disc whereby it can be produced relatively simply. On the side of the side disc 11 axially remote from the hub disc 7 a cover disc 33, gaplessly closed similarly to the side disc 9, is secured radially outside the hub disc 7 by means of the rivets 15. The cover disc 33 has a recessed portion similar to and on the opposite side of the hub disc 7 from the side disc 9. The cover disc 33 has substantially annular disc form and extends radially inwards beyond the springs 25, just like the side disc 9. In the region of the internal circumference the side disc 9 and the cover disc 33 are provided with a flat annular flange or zone 35 and 37 respectively which extends parallel to the hub disc 7. Axially between the annular zone 35 of the side disc 9 and the hub disc 7 for the one part and between the hub disc 7 and the annular zone 37 of the cover disc 33 for the other part there are arranged friction annular discs 39, 41 closed in annular form which on a relative rotation between the hub disc 7 and the side discs 9, 11 not only generate a damping friction torque but also seal off from the hub disc 7 the zone enclosed by the side disc 9 and the cover disc 33.

This zone can be filled at least partially with a lubricant which retards the wear on parts moving in relation to one another. On the side of the cover disc 33 axially remote from the hub disc 7 there is arranged an axially acting dished spring 43 which is supported for the one part on the annular zone 37 and for the other on legs 45 of several brackets 47 of substantially U-shaped cross-section which extend through openings 49 of the hub disc 7 radially within the cover disc 33 and the side disc 9 and engage with a second flange 51 in front of the side of the annular zone 35 remote from the hub disc 7. Through the brackets 47, which may be connected with one another to form one unit, the dished spring 43 clamps the hub disc 7 resiliently in between the annular zones 35, 37. In order that the annular zones 35, 37 may be brought closer to one another, the cover disc 33 consists of a relatively thin material and has axially elastic properties. The friction torque is determined essentially by the initial stress force of the dished spring 43 so that even comparatively low values of the friction torque, such as are required for example in idling operating of the internal combustion engine of the motor vehicle, can be maintained exactly. The friction device at the same time ensures the seal. The friction annular discs 39, 41 consist preferably of polytetrafluoroethyline.

For the sealing of the side disc 9 in relation to the distance ring 13 a sealing ring 53 is provided in a ring groove of the distance ring 13. The distance ring 13 may also be formed integrally on the side disc 9. For the sealing of the side disc 11 in relation to the distance ring 13 for the one part and to the cover disc 33 for the other again a single sealing ring 55, formed for example as O-ring, is provided which rests on the external circumference of the side disc 11. The distance ring 13 and the cover disc 33 protrude radially beyond the circumference of the side disc 11, the protruding outer marginal zone of the cover disc 33 being bent over, for example crimped over, towards the distance ring 13 and clamps the distance ring in sealing manner in between itself, the external circumferential surface of the side disc 11 and the axially protruding side face of the distance ring 13.

In place of the sealing rings 53 and/or 55 it can also be provided that the side disc 9 and/or the side disc 11 and also the cover disc 33 are welded by a surrounding weld seam on the distance ring 13 and thus sealed. The brackets 47 which move in the openings 49 together with the side discs 9, 11 and the cover disc 33 in relation to the hub disc 7, can be eliminated, including the dished spring 43, if the cover disc 33 has adequate spring properties of its own.

Figure 3:
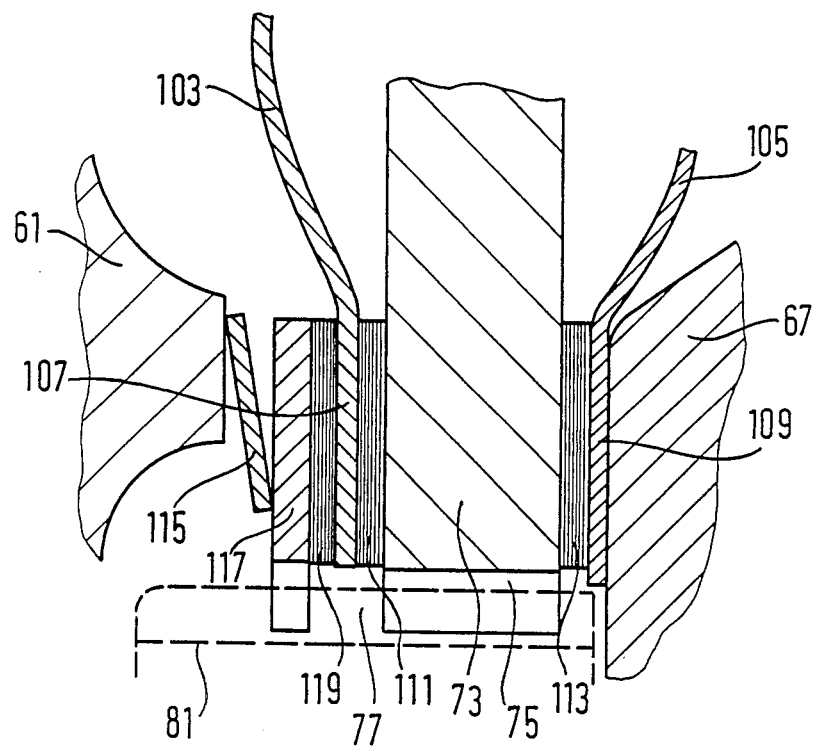
FIG. 3 shows a detail view in the direction of the arrow III in 2.

FIGS. 2 and 3 show a two-mass flywheel system for the drive line of a motor vehicle in which a first flywheel 61 (primary mass), which has a bearing flange 63 in the region of its internal circumference, on which flange, through a bearing 65, a second flywheel 67 (secondary mass) is mounted rotatably about a common rotation axis 69 but axially fixedly in relation to the flywheel 61. The first flywheel 61 is connectable through the bearing flange 63 with a crank-shaft (not illustrated further) of the internal combustion engine. The thrust plate unit of a motor vehicle friction clutch is securable in the usual way to the second flywheel 67.

The flywheels 61, 67 are rotationally elastically coupled with one another through a torsional vibration damper 71. The torsional vibration damper 71 includes an intermediate disc 73 of annular disc form which engages with an internal toothing 75 of its internal circumference into a matching external toothing 77 of an angle ring 81 fitted with rivets 79 on the flywheel 61 and is coupled through the toothings 75, 77 non-rotatably but axially movably with the flywheel 61. The intermediate disc 73 is arranged coaxially in a securing disc 83 of annular disc form which is secured with rivets 85 to the flywheel 67 in the region of the external circumference of the latter. Axially on both sides of the intermediate disc 73 there are arranged substantially flat side discs 87, 89 of annular disc form which are connected in the region of their external circumference by surrounding weld seams 91, 93 with the securing disc 83. The intermediate disc 73 contains apertures 95 in which helical compression springs 97 are seated. FIG. 2 again shows only one of these springs 97 distributed in the circumferential direction. The springs 97 engage in apertures 99, 101, axially corresponding to the aperture 95, of the two side discs 87, 89 and similarly to FIG. 1 couple the intermediate disc 73 and thus the flywheel 61 rotationally elastically with the side discs 87, 89, which form one unit together with the securing ring 83, and thus with the flywheel 67.

On the side of the two side discs 87, 89 axially remote from the intermediate disc 73 there are gaplessly closed annular cover discs 103, 105 which in the region of their external circumference are welded around the securing ring 83 and tightly by means of the weld seams 91, 93. The cover discs 103, 105 extend radially inwards beyond the springs 97 and have flat annular zones 107, 109 in the region of their internal circumference, as best shown by FIG. 3, which zones extend parallel to the intermediate disc 73. Annularly closed friction discs 111, 113 are arranged axially between the intermediate disc 73 and the annular zones 107, 109. The friction discs 111, 113 expediently consist of polytetrafluoroethylene and seal the otherwise gaplessly closed cover discs 103, 105 off from the intermediate disc 73 in the region of the internal circumference. The space enclosed by the cover discs 103, 105 can thus be partially filled with lubricant. The cover discs 103, 105 consist of comparatively thin material and are made axially elastic.

The side discs 87, 89 consist of comparatively thick material and extend with a distance from one another which is fixed by the thickness of the securing disc 83.

As further shown especially by FIG. 3, an axially acting dished spring 115, the spring force of which clamps the intermediate disc 73 in between the friction discs 111, 113, is arranged axially between the flywheel 61 and the cover disc 103. The spring force of the dished spring 115 is so selected that the friction discs 111, 113 not only take over the sealing effect but also generate a predetermined friction torque. In order to reduce wear phenomena a thrust disc 117 coupled non-rotatably with the angle ring 81 is arranged axially between the dished spring 115 and a further friction disc 119 is arranged axially between the thrust disc 117 and the cover disc 103. The support path of the dished spring 115 passes through the flywheel 61 by way of the bearing 65 to the flywheel 67. The non-rotatable coupling of the thrust disc 117 with the angle ring 81 can however in some cases be omitted, if the friction value of the dished spring 115 in relation to the thrust disc 117 (for example steel on steel) is sufficient to entrain the thrust disc 117 even against the then comparatively small friction torque of the friction disc 119.

FIG. 4 shows a variant of a two-mass flywheel system which differs from the system according to FIG. 2 primarily in that one of the flywheels, here a first flywheel 121 (primary mass), at the same time takes over the function of one of the two sealing cover discs. The flywheel 121 again has a bearing flange 123 for securing on a crank-shaft (not shown further) rotating about a rotation axis 125, of the motor vehicle internal combustion engine. A second flywheel 129 (secondary mass) is mounted rotatably about the rotation axis 125 but axially fixedly in relation to the flywheel 121 on the bearing flange 123 through a bearing 127. The thrust plate unit (not shown further) of a friction clutch is secured on the flywheel 129.

The flywheels 121, 129 are coupled rotationally elastically with one another through a torsional vibration damper 131. The torsional vibration damper 131 has an annular intermediate disc 133 which is connected non-rotatably but axially displaceably in the region of its internal circumference through a toothing 135 with the flywheel 129. The intermediate disc 133 is seated in a securing ring 137 of disc form which encloses the intermediate disc 133 and is secured with rivets 139 on the flywheel 121. The securing ring 137 is axially thicker than the intermediate disc 133 and holds flat annular side discs 141, 143, arranged on axially opposite sides of the intermediate disc 133, at an axial distance from the intermediate disc 133. While the side disc 141 adjacent to the flywheel 121 is secured in the region of its external circumference by rivets 145 on the flywheel 121, the opposite side disc 143 is welded in the region of its external circumference on the securing ring 137 by a surrounding weld seam 147.

Helical compression springs 151 are seated in a plurality of apertures 149 of the intermediate disc 133 which are distributed in the circumferential direction. FIG. 4 shows only one of the springs 151. The springs 151 engage in apertures 153, 155, corresponding axially to the aperture 149, of the two side discs 141, 143 in which they are seated similarly to FIG. 2 between stop edges, facing one another in the circumferential direction, of the apertures 149, 153, 155 and couple the intermediate disc 133 and thus the flywheel 129 rotationally elastically with the side discs 141, 143 and thus the flywheel 121.

On the side of the side disc 143 axially remote from the intermediate disc 133 there is arranged a gaplessly closed cover disc 157 which is welded in sealed manner to the securing ring 137 by the surrounding weld seam 147 in the region of its external circumference. The cover disc 157 extends radially inwards beyond the springs 151 and carries on its internal circumference a flat ring section 159 extending parallel with the intermediate disc 133. Axially opposite to the ring section 159 the flywheel 121 likewise extends flatly in a ring zone 161 and parallel with the intermediate disc 133. The flywheel 121 is gaplessly tightly closed between the ring zone 161 to over the external circumference of the side disc 141 and sealed on the external circumference of the side disc 141 by means of a sealing ring 163, just as the securing ring 137 is sealed against the side disc 141. Axially between the intermediate disc 133 for the one part and the annular zones 159 and 161 for the other part, annularly closed friction discs 165, 167 are arranged which, like the friction discs 111, 113 in FIG. 3, seal the annular zones against the intermediate disc 133. The zone enclosed between the cover disc 157 and the flywheel 121 can thus be filled at least partially with lubricant. In order that the friction rings 165, 167, in addition to their sealing function, may be utilized for the generation of a defined friction torque for the damping of torsional vibrations, the cover disc 157 consists of comparatively thin material and has axially elastic properties. In addition a dished spring 169 is clamped in between the annular zone 159 and the flywheel 129 and its axial force clamps the intermediate disc in between the friction discs 165, 167. The arrangement resembles that of FIG. 3, while in addition a thrust disc and a friction ring can be arranged between the dished spring 169 and the annular zone 159. The friction discs 165, 167 again consist preferably of polytetrafluoroethylene. As also in FIG. 2, the friction torque can be dimensioned especially for the idling operation of the internal combustion engine of the motor vehicle.

The two-mass flywheel system according to FIG. 4 comprises a further friction device 171 which is coupled directly between the two flywheels 121, 129 and in the conventional manner, for example due to a predetermined play in rotation of its coupling elements, is effective only outside the idling range, in the operation of the internal combustion engine under load.

The above-explained torsional vibration dampers are sealed off to the exterior and at least partially filled with lubricant. Thus the wear between the springs and the components co-operating with the springs is considerably reduced at great angular deflections and high rotation rates. Since the seal is at the same time a constituent of a friction apparatus dimensioned especially for idling operation, torsional vibration dampers of this kind can be constructed with low constructional expense and small dimensions.

While specific embodiments of the invention have been shown and described in detail to illustrate the application of the inventive principles, it will be understood that the invention may be embodied otherwise without departing from such principles.

What I claim is:

1. A torsional vibration damper comprising
(a) three disc parts which are substantially of annular disc form, are rotatable about about a common rotation axis and are arranged axially side-by-side, of which two outer disc parts enclose a middle disc part axially between them, are gaplessly closed and are firmly connected with one another radially outside the middle disc part to form one unit which is rotatable about the common rotation axis in relation to the middle disc part and enclose the middle disc part in sealed manner, at least one of the two outer disc parts having axially elastic properties,
(b) several springs offset in relation to one another in the circumferential direction, which are arranged in one of axially corresponding apertures and recessed portions of the three disc parts and couple the two outer disc parts rotationaly elastically with the middle disc part,
(c) annular sealing elements arranged axially between the middle disc part at each of the two outer disc parts, which seal off the outer disc parts radially between the rotation axis and the springs from the middle disc part, the sealing elements being formed of polytetrafluoroethylene as friction rings of a friction device damping torsional vibrations,
(d) axially acting resilient means which initially stress the outer disc parts axially towards one another in the region of the sealing friction rings, and
(e) said axially elastic outer disc part comprises an axially elastic, gaplessly closed cover disc of annular disc form and a side disc of annular disc form arranged axially between the cover disc and the middle disc part and comprising said apertures for the reception of said springs and wherein the cover disc reaches radially inwards beyond the side disc and rests through the sealing friction ring on the middle disc part.

2. A torsional vibration damper, comprising
(a) three disc parts which are substantially of annular disc form, are rotatable about a common rotation axis and are arranged axially side-by-side, of which two outer disc parts enclose a middle disc part axially between them, are gaplessly closed and are firmly connected with one another radially the middle disc part to form one unit which is rotatable about the common rotation axis in relation to the middle disc part and enclose the middle disc part in sealed manner, at least one of the two outer disc parts having axially elastic properties,
(b) several springs offset in relation to one another in the circumferential direction, which are arranged in one of axially corresponding apertures and recessed portions of the three disc parts and couple the two outer disc parts rotationally elastically with the middle disc part,
(c) annular sealing elements arranged axially between the middle disc part at each of the two outer disc parts, which seal off the outer disc parts radially between the rotation axis and the springs from the middle disc part, the sealing elements being formed of polytetrafluoroethylene as friction rings of a friction device damping torsional vibrations, and
(d) axially acting resilient means which initially stress the outer disc parts axially towards one another in the region of the sealing friction rings, said axially elastic outer disc part comprises an axially elastic, haplessly closed cover disc of annular disc form and a side disc of annular disc form: arranged axialy between the cover disc and the middle disc part and comprising one of said apertures and recessed portions for the reception of said springs and wherein the cover disc reaches radially inwards beyond the side disc and rests through the sealing friction ring on the middle disc part.

3. A torsional vibration damper according to claim 1 or 2 wherein the cover disc consists of thinner material than does the side disc.

4. A torsional vibration damper according to claim 1 or 2 wherein the cover disc has axial spring properties for the formation of the resilient means.

5. A torsional vibration damper according to claim 1 or 2 wherein as resilient means a dished spring is arranged on the side of the cover disc axially remote from the middle disc part in the radial region of the friction ring, which dished spring is supported at one part on the cover disc of the adjacent outer disc part and at another part through a bridge part penetrating the middle disc part on the opposite outer disc part.

6. A torsional vibration damper according to claim 5, wherein the middle disc part is formed as a hub disc of a clutch disc and comprises openings radially within the sealing friction rings, through which openings there pass brackets of substantially U-shaped cross-section which form the bridge part and with their legs radially overlapping the cover disc and the opposite outer disc part on axially mutually remote sides.

7. A torsional vibration damper according to claim 5, wherein the middle disc part is arranged axially between two flywheels of a two-flywheel mass system, which are rotatable about the common rotation axis, of which flywheels a second flywheel is mounted rotatably in relation to a first flywheel but axially fixedly on the first flywheel and wherein the dished spring is clamped in between the cover disc and the flywheel axially adjacent to the cover disc.

8. A torsional vibration damper according to claim 7, wherein the middle disc part is connected in the region of its internal circumference non-rotatably but axially movably with the first flywheel and the two outer disc parts are connected in the region of their external circumference firmly with the second flywheel, wherein the two outer disc parts each include an axially elastic, gaplessly closed cover disc of annular disc form and a side disc of annular disc form arranged axially between the cover disc and the middle disc part and comprising the apertures for the reception of the springs, and wherein the dished spring is arranged between the first flywheel and the axially adjacent cover disc.

9. A torsional vibration damper according to claim 7, wherein the first flywheel forms the sealing part of one of the two outer disc parts and the other outer disc part comprises the axially elastic cover disc and wherein the dished spring is arranged axially between the cover disc and the second flywheel.

10. A torsional vibration damper according to claim 2 or 14, wherein the two outer disc parts are sealed off against one another on their external circumference by means of at least one surrounding weld seam, the middle disc part is arranged coaxially rotatably in a securing ring the axial thickness of which is greater than the thickness of the middle disc part and wherein at least one of the two outer disc parts is welded by the surrounding weld seam to the securing ring.

11. A torsional vibration damper according to claim 1 or 2, wherein the middle disc part is coaxially rotatably arranged in a securing ring the axial thickness of which is greater than the thickness of the middle disc part and wherein at least one of the outer disc parts is sealed off by means of an annular seal in relation to the securing ring, at least one the two outer disc parts comprises an axially elastic, gaplessly closed cover disc of annular disc form and a side disc of annular disc form arranged axially between the cover disc and the middle disc part and carrying the apertures for the springs, over the external circumference of which side disc the securing ring and the cover disc protrude radially, wherein the outer edge of the cover disc protruding beyond the side disc is bent over towards the securing ring, and wherein between the bent over outer edge of the cover disc, the securing ring and the external circumference of the side disc a sealing ring is arranged which seals off the cover disc, the side disc and the securing ring in relation to one another.

12. A torsional vibration damper comprising
(a) three disc parts which are substantially of annular disc form, are rotatable about a common rotation axis and are arranged axially side-by-side, of which two outer disc parts enclose a middle disc part axially between them, are gaplessly closed and are firmly connected with one another radially outside the middle disc part to form one unit which is rotatable about the common rotation axis in relation to the middle disc part and enclose the middle disc part in sealed manner, at least one of the two outer disc parts having axially elastic properties,
(b) several springs offset in relation to one another in the circumferential direction, which are arranged in one of axially corresponding apertures and recessed portions of the three disc parts and couple the two outer disc parts rotationally elastically with the middle disc part,
(c) annular sealing elements arranged axially between the middle disc part at each of the two outer disc parts, which seal off the outer disc parts radially between the rotation axis and the springs from the middle disc part, the sealing elements being formed of polytetrafluoroethylene as friction rings of a friction device damping torsional vibrations,
(d) axially acting resilient means which initially stress the outer disc parts axially towards one another in the region of the sealing friction rings, and
(e) the middle disc part is coaxially rotatably arranged in a securing ring the axial thickness of which is greater than the thickness of the middle disc part and wherein at least one of the outer disc parts is sealed off by means of an annular seal in relation to the securing ring, at least one of the two outer disc parts comprises an axially elastic, gaplesly closed cover disc of annular disc form and a side disc of annular disc form arranged axially between the cover disc and the middle disc part and carrying the apertures for the spring, over the external circumference of which side is the securing ring and the cover disc protrude radially, wherein the outer edge of the cover disc protruding beyond the side disc is bent over towards the securing ring, and wherein between the bent over outer edge of the cover disc, the securing ring and the external circumference of the side disc a sealing ring is arranged which seals off the cover disc, the side disc and the securing ring in relation to one another.

* * * * *